United States Patent [19]
Hampsten et al.

[11] Patent Number: 5,881,317
[45] Date of Patent: Mar. 9, 1999

[54] ADAPTIVE OPERATION OF AUDIO PERIPHERALS BASED ON THE FUNCTIONALITY OF ANALOG AUDIO INTERFACE

[75] Inventors: Russ K. Hampsten, Beaverton; Gary A. Solomon, Hillsboro, both of Oreg.

[73] Assignee: Intel Corporation, Santa Clara, Calif.

[21] Appl. No.: 723,028

[22] Filed: Sep. 30, 1996

[51] Int. Cl.⁶ .................................................. G06F 13/00
[52] U.S. Cl. ........................ 395/882; 395/883; 395/884; 395/681
[58] Field of Search .................................. 395/882, 681, 395/889, 883, 884, 892

[56] References Cited

U.S. PATENT DOCUMENTS

| | | | |
|---|---|---|---|
| 5,042,070 | 8/1991 | Linna et al. | 381/59 |
| 5,297,231 | 3/1994 | Miller | 395/2.1 |
| 5,412,732 | 5/1995 | Kanishi et al. | 381/18 |
| 5,553,220 | 9/1996 | Keene | 395/154 |
| 5,630,175 | 5/1997 | Gajewski et al. | 395/892 |
| 5,642,422 | 6/1997 | Hon et al. | 381/19 |
| 5,648,778 | 7/1997 | Linz et al. | 341/110 |
| 5,664,095 | 9/1997 | Cox et al. | 395/184.01 |
| 5,699,411 | 12/1997 | Becker et al. | 379/88 |
| 5,706,335 | 1/1998 | Hinderks | 379/93 |
| 5,768,631 | 6/1998 | Kam et al. | 395/892 |
| 5,793,961 | 8/1998 | Marisetty et al. | 395/200.8 |

*Primary Examiner*—Robert W. Beausoliel, Jr.
*Assistant Examiner*—Scott T. Baderman
*Attorney, Agent, or Firm*—Blakely, Sokoloff, Taylor & Zafman LLP

[57] ABSTRACT

A computer system is provided with a device driver for adaptively operating a number of audio peripherals through a pair of digital audio controller and analog audio interface, in accordance with the audio functions supported by the analog audio interface, including for at least one audio function, the kind of support being provided. The analog audio interface includes one or more control registers for storing a number of functional indicators to indicate the audio functions supported, and for the at least one audio function, the support kind. The analog audio interface further includes a number of control registers for storing control information for modifying the behavior of the supported audio functions. These control information include a number enabling/disabling indicators and a number of power management indicators to allow the device driver to selectively enable/disable certain ones of the audio functions, as well as selectively power up and down certain ones of a number of independently powered components of the audio analog interface.

22 Claims, 10 Drawing Sheets

FIG. 2

Reset Register

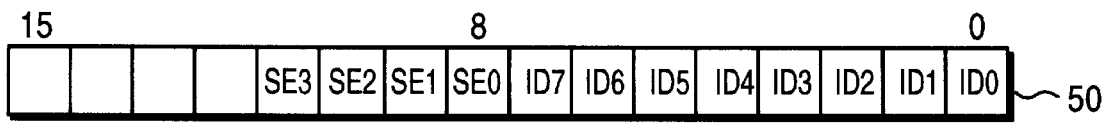

| Bit = 1 | Function |
| --- | --- |
| ID0 | Dedicated Mic PCM in channel |
| ID1 | Modem Line Codec Support |
| ID2 | Bass & Treble control |
| ID3 | Simulated Stereo (Mono to Stereo) |
| ID4 | Headphone out support |
| ID5 | Loudness (bass boost) support |
| ID6 | 18 bit DAC resolution |
| ID7 | 20 bit DAC resolution |

| SE3...SE0 | Function |
| --- | --- |
| 0 | No 3D stereo Enhancement |
| 1 | Analog Devices 3D sound |
| 2 | AMD 3D sound |
| 3 | Aztech 3D sound |
| 4 | BBE 3D sound |
| 5 | Creative 3D sound |
| 6 | Crystal Semiconductor 3D sound |
| 7 | ESS 3D sound |
| 8 | IBM 3D sound |
| 9 | Media Vision 3D sound |
| 10 | National Semiconductor 3D sound |
| 11 | Opti 3D sound |
| 12 | Q-Sound QX |
| 13 | Spatializer |
| 14 | SRS |
| 15 | Yamaha 3D sound |

FIG. 3

On/off & Power Mgmt Register

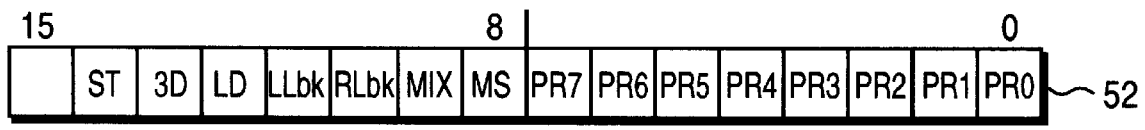

| Bit | Function |
|---|---|
| ST | Simulated Stereo Enhancement on/off 1 = on |
| 3D | 3D Stereo enhancement on/off 1 = on |
| LD | Loudness (bass boost) on/off 1 = on |
| LLbk | Local Loop Back - For Modem Line Codec |
| RLbk | Remote Loop Back - For Modem Line Codec |
| MIX | Mono output select 0=Mix, 1=Mic |
| MS | Mic select 0=Mic1, 1=Mic2 |

| Bit | Function |
|---|---|
| PR0 | ADCs Powerdown |
| PR1 | DACs Powerdown |
| PR2 | Analog Mixer powerdown (Vref still on) |
| PR3 | Analog Mixer powerdown (Vref off) |
| PR4 | Digital Interface powerdown (including Oscillator) |
| PR5 | Modem ADC/DACs off - if supported |

Source Selection Register

| SR2...SR0 | Right Record Source |
|---|---|
| 0 | Mic |
| 1 | CD in (R) |
| 2 | Video in (R) |
| 3 | Aux in (R) |
| 4 | Line in (R) |
| 5 | Stereo Mix (R) |
| 6 | Mono Mix |
| 7 | Phone |

| SL2...SL0 | Left Record Source |
|---|---|
| 0 | Mic |
| 1 | CD in (L) |
| 2 | Video in (L) |
| 3 | Aux in (L) |
| 4 | Line in (L) |
| 5 | Stereo Mix (L) |
| 6 | Mono Mix |
| 7 | Phone |

FIG. 5
Stereo Input Gain Control Register
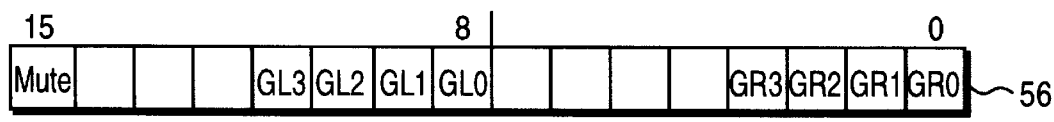
Microphone Input Gain Control Register
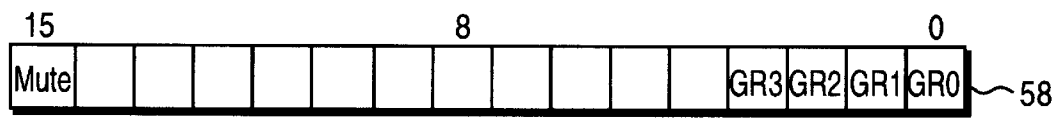
| Mute | Gx3...Gx0 | Function |
|---|---|---|
| 0 | 0000 | +22.5dB gain |
| 0 | 1111 | 0dB gain |
| 1 | xxxxx | $-\infty$dB gain |
PC_Beep Volume Control Register
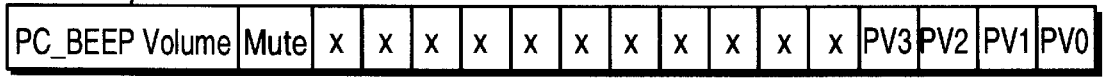
| Mute | PV3...PV0 | Function |
|---|---|---|
| 0 | 0000 | 0dB Attenuation |
| 0 | 1111 | 45dB Attenuation |
| 1 | xxxx | $\infty$dB Attenuation |

FIG. 6

Analog Input Gain Control Register

| | | | | | | | | | | | | |
|---|---|---|---|---|---|---|---|---|---|---|---|---|
| Phone Volume | Mute | x | x | x | x | x | x | x | GN4 | GN3 | GN2 | GN1 | GN0 |
| Mic Volume | Mute | x | x | x | x | x | x | 20dB | GN5 | GN4 | GN3 | GN2 | GN1 | GN0 |
| Line in Volume | Mute | x | GL4 | GL3 | GL2 | GL1 | GL0 | x | x | GR4 | GR3 | GR2 | GR1 | GR0 |
| CD Volume | Mute | x | GL4 | GL3 | GL2 | GL1 | GL0 | x | x | GR4 | GR3 | GR2 | GR1 | GR0 |
| Video Volume | Mute | x | GL4 | GL3 | GL2 | GL1 | GL0 | x | x | GR4 | GR3 | GR2 | GR1 | GR0 |
| Aux Volume | Mute | x | GL4 | GL3 | GL2 | GL1 | GL0 | x | x | GR4 | GR3 | GR2 | GR1 | GR0 |
| PCM Out Vol | Mute | x | GL4 | GL3 | GL2 | GL1 | GL0 | x | x | GR4 | GR3 | GR2 | GR1 | GR0 |

(columns labeled 62, 64, 66, 68, 70, 72, 74)

| Mute | Gx4...Gx0 | Function |
|---|---|---|
| 0 | 00000 | +12dB gain |
| 0 | 01000 | 0dB gain |
| 0 | 11111 | -34.5dB gain |
| 1 | xxxxx | -°dB gain |

FIG. 7

Play Volume Control Registers

| | | | | | | | | | | |
|---|---|---|---|---|---|---|---|---|---|---|
| Master Volume | Mute | x | ML5 | ML4 | ML3 | ML2 | ML1 | ML0 | x | MR5 MR4 MR3 MR2 MR1 MR0 | ~76 |
| Headphone Volume | Mute | x | ML5 | ML4 | ML3 | ML2 | ML1 | ML0 | x | MR5 MR4 MR3 MR2 MR1 MR0 | ~78 |
| Master Volume Mono | Mute | x | x | x | x | x | x | x | x | MM5 MM4 MM3 MM2 MM1 MM0 | ~80 |
| Master tone (R & L) | x | x | x | BA4 | BA3 | BA2 | BA1 | BA0 | x | TR4 TR3 TR2 TR1 TR0 | ~82 |

| Mute | Mx5...Mx0 | Function | Range |
|---|---|---|---|
| 0 | 00 0000 | 0dB Attenuation | Req. |
| 0 | 01 1111 | 46.5dB Attenuation | Req. |
| 0 | 11 1111 | 94.5dB Attenuation | Optional |
| 1 | xx xxxx | ∞dB Attenuation | Req. |

| TR3...TR0 or BA3...BA0 | Function |
|---|---|
| 0 0000 | +15dB of gain |
| 0 1111 | 0dB of gain |
| 1 1110 | -15dB of gain |
| 1 1111 | Bypass |

3D Stereo Enhancement Control Register

| CR3...CR0<br>DP3...DP0 | Center<br>Depth |
|---|---|
| 0 | 0% |
| 1 | 6.67% |
| • | • |
| • | • |
| 14 | 93.33% |
| 15 | 100% |

Modem Rate Control Register

| R0 - R15 | Modem Rate |
|---|---|

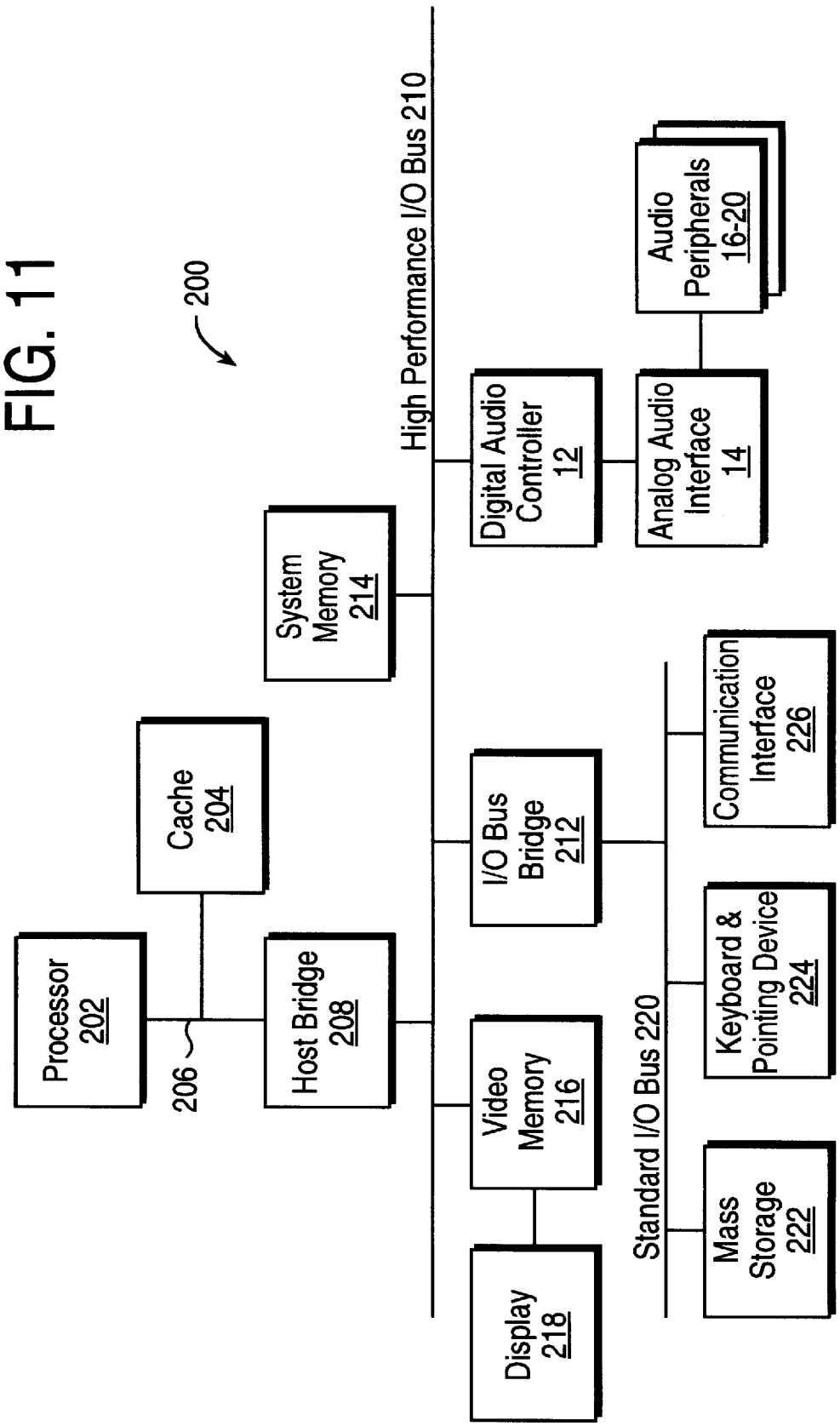

ADAPTIVE OPERATION OF AUDIO PERIPHERALS BASED ON THE FUNCTIONALITY OF ANALOG AUDIO INTERFACE

BACKGROUND OF THE INVENTION

1. Field of the Invention

The present invention relates to the field of computer systems. More specifically, the present invention relates to the operation of audio peripherals.

2. Background Information

Sounds can be recorded and manipulated by electronic systems by first converting sound waves into corresponding electrical impulses, then using electronic circuitry to store or modify these impulses. After modification and/or storage, the electrical impulses are converted back into sound waves. For example, in a basic, analog amplification system, a microphone converts sound waves (air compression waves) into voltage signals whereby the louder the sound the greater the voltage and the greater the sound wave frequency the greater the voltage frequency. This audio signal, which now corresponds to the original sound wave, is then run through circuitry to increase the voltage amplitude. Finally, this amplified audio voltage signal (or its associated current signal) is fed into a speaker which reconverts the audio signal back into sound waves which are louder than the original sound waves picked up by the microphone.

In the analog circuitry used in the amplifier example described above, the amplitude and frequency of the audio signals manipulated by the circuitry is directly related to the amplitude and frequency of its corresponding sound wave. One problem with modifying audio signals using analog circuitry is that a significant amount of noise tends to be added to the signal by inherent non-linearity of the transistors and other electronic components in the circuit.

In contrast, digital audio signals are represented by discrete digital samples of the analog audio signal, creating a stream of individual numbers which effectively "describe" the audio signal. Digital audio signals are modified using digital circuitry, the advantage of which is that non-linearity of the transistors in the circuit will not introduce noise to the audio signal because the transistors are not operated in their linear region. Instead, the sound quality of digitally manipulated audio signals is more a function of the sampling frequency and the maximum value (or bit length or resolution) of the audio signal samples. In addition, dealing with digital rather than analog audio signals can be advantageous because digital audio signals are compatible with digital electronic systems such as, for example, personal computers, thereby allowing a user to apply the advanced interfaces and processing power of these devices to audio signal processing.

Prior art computer system audio interfaces typically contain both the analog as well as digital circuitry. As such, the application specific integrated circuits (ASICs) used to implement these audio interfaces typically contain the digital circuitry necessary to support bus mastering and slave operation in accordance with a bus protocol, as well as the digital circuitry necessary to control analog circuit functions and to perform digital signal processing. Additionally, these audio interfaces also include the analog circuitry necessary to support analog audio signal exchange with a number of audio peripherals, such as microphone, CD player, modem, headset, and speaker, as well as any analog signal processing circuitry to support, for example, analog mixing, amplification, and filtering. As stated above, analog circuitry can add a significant amount of noise to an audio signal due to inherent limitations of the circuit components themselves when operated in their linear range. Because of this, special care must be taken and special materials are used to fabricate the analog circuitry of these audio interface ASICs, so that the circuit components are of high quality and contribute as little noise as possible to the analog audio signal.

Because these audio interface ASICs comprise a significant amount of both analog and digital circuitry on a single IC, the special fabrication process used to manufacture the analog circuitry of the device is also used to manufacture the digital circuitry of the device. As stated above, digital audio signal noise is more a function of sampling frequency and bit length rather than digital circuit component quality. Therefore, expensive fabrication costs associated with creating high quality analog circuitry for audio interface ASICs is effectively wasted on the digital circuitry of the device, thereby increasing the cost of the overall device and significantly limiting the size, complexity, and device density of the digital circuitry.

In copending U.S. patent application Ser. No. 08/673,282, entitled "Audio Serial Digital Interconnect", filed on Jun. 28, 1996, and having common inventorship as well as assignee with the present invention, a split architecture employing a digital controller and an analog audio interface packaged in separate ASICs, including an interconnect approach for interconnecting the two components, was disclosed. It is desirable that both the digital controller and the analog audio interface can be manufactured by a large number of different vendors. In other words, it is desirable that audio peripherals of a computer system may be operated through a digital controller manufactured by any one of a number of manufacturers, in conjunction with an analog audio interface manufactured by the same or any one of a number of other manufacturers.

SUMMARY OF THE INVENTION

In view of the limitations of the prior art, and the above described desire, a computer system is provided with a device driver for adaptively operating a number of audio peripherals through a pair of digital audio controller and analog audio interface, in accordance with the audio functions supported by the analog audio interface, including for at least one audio function, the kind of support being provided. The analog audio interface includes one or more control registers for storing a number of functional indicators used to identify audio functions supported, and for the at least one audio function, the support kind. The analog audio interface further includes a number of control registers for storing control information for modifying the behavior of the supported audio functions. These control information includes a number enabling/disabling indicators, a number of power management indicators and a number of operating parameters, to allow the device driver to selectively enable/disable certain ones of the audio functions, selectively power up and down certain ones of a number of independently powered components of the audio analog interface, selectively engage certain ones of the audio peripherals to provide input audio, selectively engage certain ones of the audio peripherals to output audio, as well as selectively control certain ones of the audio functions being performed on the audio signals. As a result, a compatible digital audio controller manufactured by any one of a number of manufacturers may be used in conjunction with a compatible analog audio interface manufactured by the same manufacturer or any one of a number of other manufacturers. The same device driver/digital audio controller, without modification, may facilitate a wide range of audio experience, depending on the companions analog audio interface and audio peripherals used.

BRIEF DESCRIPTION OF DRAWINGS

The present invention will be described by way of exemplary embodiments, but not limitations, illustrated in the accompanying drawings in which like references denote similar elements, and in which:

FIG. 2 illustrates one embodiment of a reset register for indicating audio functions supported by the analog audio interface;

FIG. 3 illustrates one embodiment of an on/off and power management register for enabling/disabling supported audio function, as well as managing power consumption by the analog audio interface;

FIGS. 4–9 illustrate one embodiment each of a number of registers for controlling the analog audio interface;

FIG. 11 illustrates one embodiment of a computer system suitable for practicing the present invention.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the-order of presentation.

Figure 1:
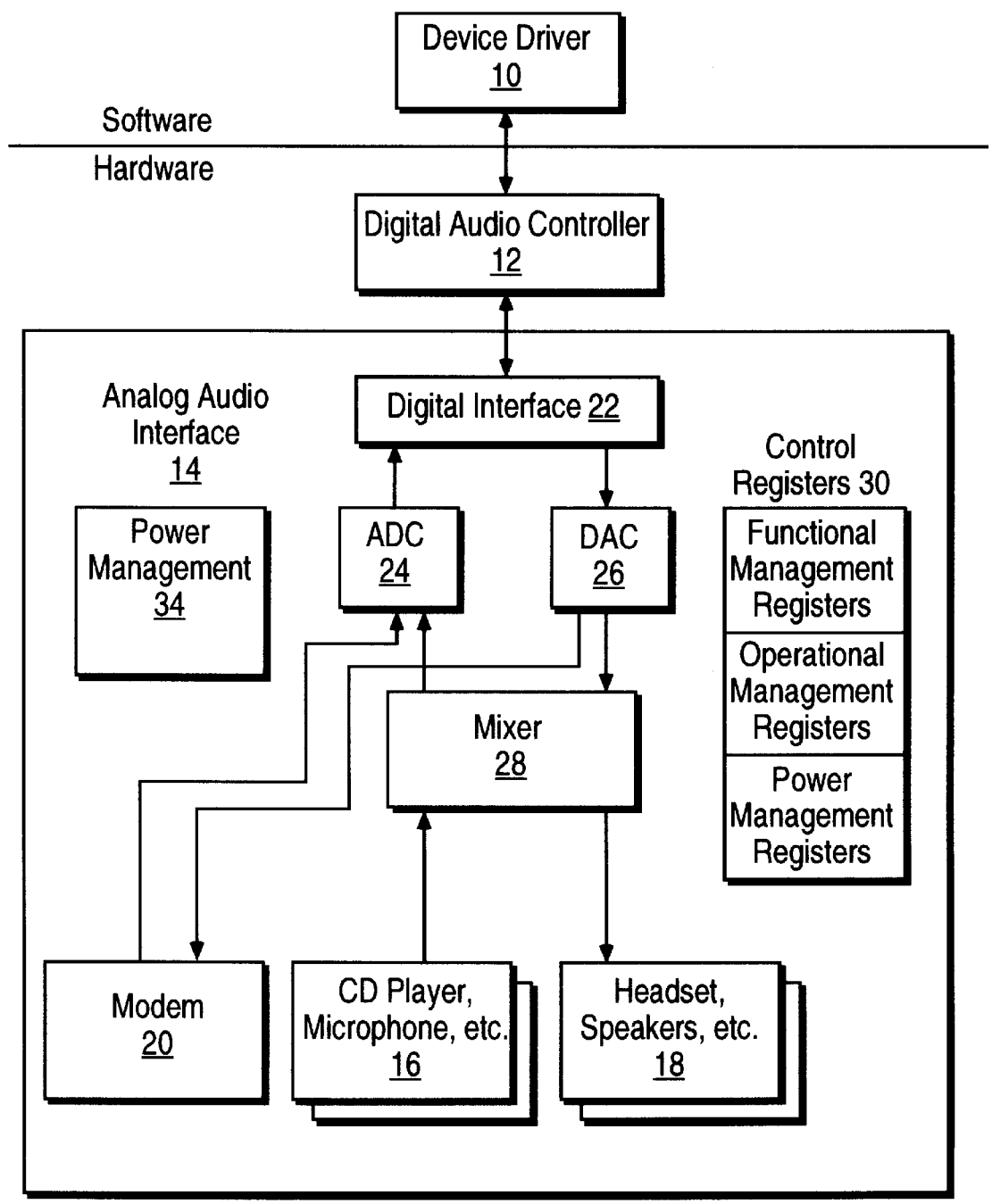
FIG. 1 illustrates one embodiment of the present invention.

Referring now to FIG. 1, wherein one embodiment of the present invention is shown. As illustrated, a computer system is provided with device driver 10 for adaptively operating a number of audio peripherals 16, 18 and 20, through digital audio controller 12 and analog audio interface 14, in accordance with the audio functions supported by analog audio interface 14. Digital audio controller 12 and analog audio interface 14 are packaged as separate components and communicate with each other through a predefined protocol, such as the interconnect approach disclosed in the aforementioned copending U.S. patent application. Examples of audio peripherals include input peripherals 16, such as a CD player, or a microphone, and output peripherals 18, such as a headset or speakers. Additionally, audio peripherals may also include modem 20 that handles both inbound as well as outbound audio signals.

Continuing to refer to FIG. 1, analog audio interface 14 include digital interface 22, analog to digital converter 24, digital to analog converter 26, and mixer 28. Additionally, analog audio interface 14 includes control register 30, non-volatile memory 32, and power management circuitry 34. For the illustrated embodiment, digital interface 22, analog to digital converter 24, digital to analog converter 26 and mixer 28 are independently powered. Digital interface 22 interfaces with digital audio controller 12 for analog audio interface 14, in accordance with the predefined protocol. Analog to digital converter 24 converts analog audio signals into digital audio signals, whereas digital to analog converter 26 converts digital audio signals back into analog audio signals. Mixer 28 combines various audio signals. These elements are known in the art, and will not be otherwise further described.

Control registers 30 include at least one functional management register for storing a number of functional indicators indicating whether certain ones of the audio functions are supported by analog audio interface 14, and for selectively enabling/disabling the audio functions supported. Furthermore, for the illustrated embodiment, for at least one audio function, if the support is provided, the kind of support is also indicated. Additionally, control registers 30 include at least one power management register for selectively powering up or down the components of analog audio interface 14, and a number of operational management registers for controlling the audio functions being performed. Power management circuitry 34, which is coupled to all the independently powered components (not shown), manages the powering up and down, in accordance with the power management information stored in the at least one power management register. For the illustrated embodiment, control registers 30 include a state machine (not shown), having a set of default values appropriate for the audio functions supported by analog audio interface 14, for initializing control registers 30 at power on or reset. Additionally, for the illustrated embodiment, the state machine also reloads control registers 30 with the default value, whenever a write operation is performed against the functional management register.

Thus, in operation, upon power on/reset, the state machine initializes control registers 30 with its default values. Upon initialization, device driver 10 operates audio peripherals 16, 18 and 20 through digital audio controller 12 and analog audio interface 14, based on the audio functions supported by analog audio interface 14, as indicated in the at least one functional management register, selectively enabling/disabling supported audio functions, selectively powering up or down components of analog audio interface 14, and modifying various operating parameters as appropriate. Thus, a digital controller 12 manufactured by any one of a number of manufacturers may be used in conjunction with an analog audio interface 14 manufactured by the same or any one of a number of other manufacturers to facilitate operation of audio peripherals 16, 18 and 20, provided each analog audio interface 14 identifies its audio functions supported, allows its supported audio functions to be selectively enabled/disabled, allows its internal components to be selectively power up or down, and allows a wide range of operating parameters to be modified with fine granularity, in accordance with the teachings of the present invention. As will be appreciated by those skilled in the art, as a result of the present invention, a device driver/digital controller combination, without modification, may facilitate a wide range of audio experience for the user, depending on the companion analog audio interface/audio peripherals combination used.

FIG. 2 illustrates one embodiment of a reset register 50 for storing a number of functional indicators for indicating audio functions supported by analog audio interface 14. For the illustrated embodiment, 8 bits, ID0–ID7 are employed to indicate whether dedicated microphone PCM In (Pulse Code Modulation Input), modem, bass and treble control, simulated stereo, headphone out, bass boost, 18 bit resolution digital to analog conversion and 20 bit resolution digital to analog conversion are supported. Additionally, 4 bits, SE0–SE3 are employed to indicate whether 3D stereo enhancement is supported, and if supported, whether it is, e.g. IBM's approach to 3D sound, or Yamaha's approach to 3D sound that is supported. Device driver 10 is equipped to detect and utilize any one of these proprietary approaches to 3D stereo enhancements, through standard hardware programming interface. For the illustrated embodiment, performing a write operation to reset register 50 results in all other registers being restored to the appropriate default values.

FIG. 3 illustrates one embodiment of a combined on/off and power management register 52 for storing a number of enabling/disabling indicators for selectably enabling/disabling the audio functions supported. For the illustrated embodiment, 5 bits, ST, 3D, LD, LLbk, and RLbk are employed to enable/disable simulated stereo enhancement, 3D stereo enhancement, bass boost, local modem loop back and remote modem loop back, with 2 bits, MIX and MS employed to select mono output, and select microphone input. Additionally, 6 bits, PR0–PR5 are employed to selectably powered up or down analog to digital converter 24, digital to analog converter 26, mixer 28, digital interface 22. In the case of the converters 24 and 26, the powering up and down may be restricted to the modem portions only. Similarly, for mixer 28, the powering up and down may be done with or without leaving "VREF" on (voltage reference for DAC and ADC).

Figure 4:
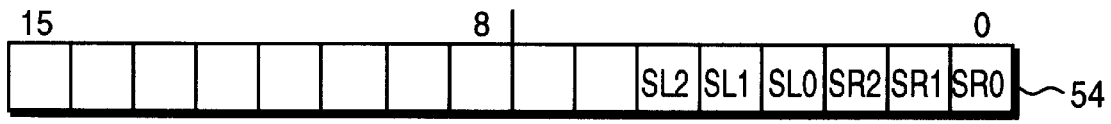

FIGS. 4–8 illustrate one embodiment each of a number of operational management registers. As illustrated in FIG. 4, operational management registers include source selection register 54 for selecting the left and the right channel audio capture (record) sources. For the illustrated embodiment, 3 bits, SR0–SR2, are used to select the audio peripheral for the right channel input audio source, and another 3 bits, SL0–SL2, are used to select the audio peripheral for the left channel input audio source. The audio peripheral may be either a microphone, a CD player, a video player, an auxiliary audio peripheral, a modem, a stereo mix, a mono mix or telephone mix data.

As illustrated in FIG. 5–6, operational management registers also include registers 56–74 for storing control values for controlling the gain to be applied to stereo input, microphone input, a PC_beep signal, and various analog inputs. In the case of stereo input, 8 bits, GR0–GR3 and GL0–GL3, and a mute bit are employed to specify the appropriate gain for the right and the left channels. In the case of microphone input and the PC_beep signal, 4 bits each, GN0–GN3 and PV0–PV3, and a mute bit are employed. In the case of analog phone input, 6 bits, GN0–GN4 and a mute bit are employed. In the case of analog microphone input, 7 bits, GN0–GN4 and a special 20 db bit, and a mute bit are employed. In each of the cases of analog modem, CD player, video player, auxiliary audio peripheral and PCM out, 8 bits, GR0–GR3 and GL0–GL3, and a mute bit are employed.

Figure 8:

As illustrated in FIGS. 7–8, operational management registers further include registers 76–84 for storing a number of control values for controlling the amount of gain to be applied to a number of audio outputs, master volume, headphone volume, bass and treble control, and the center and depth values for 3D stereo enhancement. In each of the cases of master and headphone volume, 12 bits, MR0–MR5 and ML0–ML5, and a mute bit are employed. In the case of mono master volume, 6 bits, MM0–MM5, and a mute bit are employed. In the case of tone control, 10 bits, TR0–TR4 and BA0–BA4, are employed. In the case of 3D stereo enhancement, 4 bits, CR0–CR3, are employed to specify the center value, while another 4 bits DP0–DP3, are employed to specify the depth value.

Figure 9:
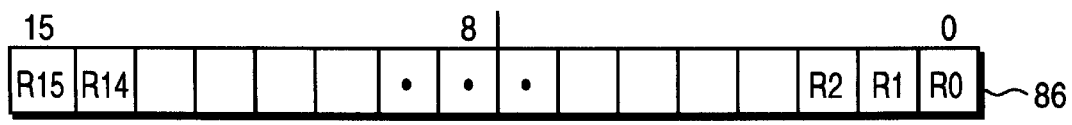

As illustrated in FIG. 9, control registers 30 further include modem rate control register 86 for storing a modem rate for controlling modem signals going through analog audio interface 14. For the illustrated embodiment, 16 bits, R0–R15, are used to specify the modem rate.

Figure 10:
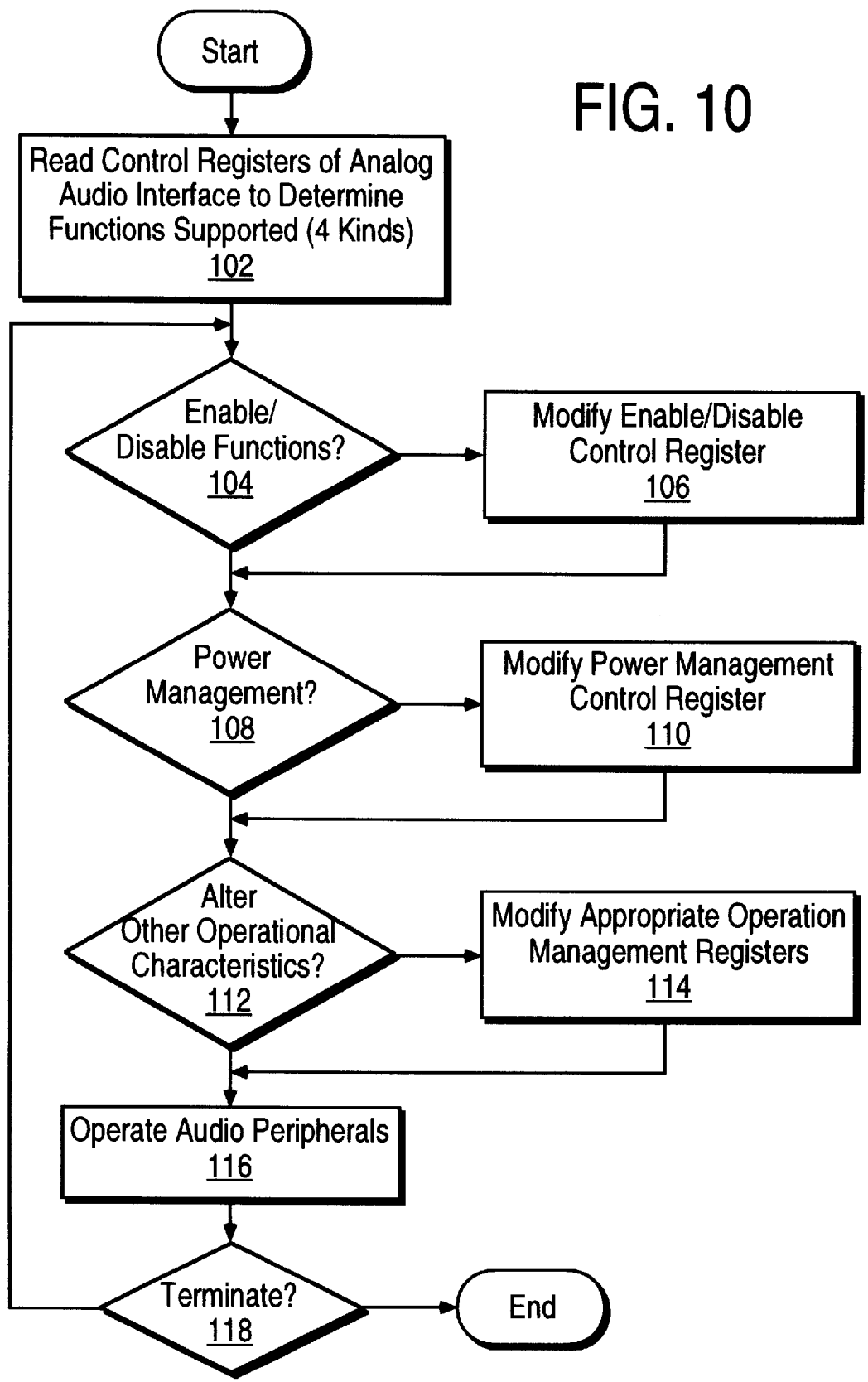
FIG. 10 illustrates one embodiment of the operational steps of the device driver of FIG. 1.

FIG. 10 illustrates one embodiment of the operational steps of device driver 10. As shown, upon invocation, device driver 10, through digital controller 12, reads reset control register 50 to determine the audio functions supported by analog audio interface 14, step 102. For some audio functions, the step includes reading control registers 30 to determine the kind of support provided. Then device driver 10 proceeds to operate audio peripherals 16, 18 and 20 based on the audio functions supported by analog audio interface 14, steps 104–116. If certain supported audio functions are to enabled or disabled, device driver 10, through digital controller 12, modifies enable/disable control register 52, steps 104 106. If certain components of analog audio interface 14 are to be powered up or down, device driver 10, through digital controller 12, modifies power management control register 52, steps 108–110. If certain operating characteristics are to be altered, device driver 10, through digital controller 12, modifies the appropriate ones of control registers 30, steps 112–114. Otherwise, device driver 10, through digital controller 12 and analog audio interface 14, operates audio peripherals 16, 18 and 20, step 116. The operations continue until device driver 10 is instructed to terminate, step 118.

FIG. 11 illustrates one embodiment of a computer system suitable for practicing the present invention described above. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 220 are bridged by I/O bus bridge 212. Coupled to processor bus is cache 204. Coupled to standard I/O bus 220 are disk drive 222, keyboard and pointing device 224 and communication interface 226. Coupled to high performance I/O bus 210 are system memory 214 and video memory 216, against which video display 218 is coupled. Additionally, coupled to high performance I/O bus 220 is digital audio controller 12, against which analog audio interface 14 is coupled. Coupled to analog audio interface 14 are audio peripherals 16–20.

These elements perform their conventional functions known in the art, in particular, disk drive 222 and system memory 214 are used to store a permanent and a working copy of device driver 10. Except for the teachings of the present invention, constitutions of these elements are known. Any one of a number of implementations of these elements known in the art may be used to form computer system 200 for practice of the present invention.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. Accordingly, the description is to be regarded as illustrative instead of restrictive on the present invention.

Thus, a method and apparatus for adaptive operation of audio peripheral based on the functionality of the interfacing analog audio interface has been described.

What is claimed is:

1. A computer system comprising:
   a) a plurality of audio peripherals for inputting and outputting audio;
   b) an analog audio interface coupled to the audio peripherals for performing audio functions on audio signals originated from, and destined for the audio peripherals, the analog audio interface having a first control register for storing a first set of bits indicating audio functions supported by the analog audio interface, and a second set of bits indicating a support kind for a particular audio function;
   c) a digital audio controller coupled to the analog audio interface for interfacing with the analog audio interface; and
   d) a device controller for adaptively operating the audio peripherals through the digital audio controller and the analog audio interface, in accordance with the audio functions supported by the analog audio interface including the support kind where applicable.

2. The computer system of claim 1, wherein
   the audio functions include 3D stereo enhancement and at least one of dedicated microphone PCM In, modem line codec, bass and treble control, simulated stereo, headphone out, loudness, and 18/20 bit DAC resolution; and
   the particular audio function includes said 3D stereo enhancement, and the support kind for said 3D stereo enhancement being one of a plurality of vendor proprietary 3D stereo enhancement approaches.

3. The computer system of claim 1, wherein the control registers of the analog audio interface further include a second control register for storing a plurality of enabling/disabling indicators indicating whether certain ones of the audio functions are enabled or disabled.

4. The computer system of claim 3, wherein the audio functions include some or all of simulated stereo enhancement, 3D stereo enhancement, bass boost, modem local loop back and modem remote loop back.

5. The computer system of claim 1, wherein
   the analog audio interface further includes a plurality of independently powered functional components; and
   the control registers of the analog audio interface further include a second control register for storing a plurality of power management indicators correspondingly indicating whether each of the independently powered functional components is to be powered up or down.

6. The computer system of claim 5, wherein the independently powered functional components include a mixer, an analog-to-digital converter, a digital-to-analog-converter, and a digital interface to the digital audio controller.

7. The computer system of claim 5, wherein the independently powered functional components include a mixer having a plurality of power states, and the power management indicators include corresponding indicators for each of the mixer's power states.

8. The computer system of claim 1, wherein the control registers of the analog audio interface further include a second control register for storing a first and a second audio source selection indicator correspondingly indicating whether certain input ones of the audio peripherals are to be selected as a first and a second channel input audio source.

9. The computer system of claim 8, wherein the input ones of the audio peripherals include some or all of microphone, compact disk player, video source, auxiliary source, modem and telephone mix data.

10. The computer system of claim 1, wherein the control registers further include a second control register for storing a gain indicator indicating an amount of gain is to be applied to an input audio.

11. The computer system of claim 1, wherein the control registers further include a second control register for storing a gain indicator indicating an amount of gain is to be applied to an output audio.

12. The computer system of claim 1, wherein the audio functions include a 3D stereo enhancement function, and the control registers further include a second control register for storing a plurality of 3D stereo enhancement parameters.

13. The computer system of claim 1, wherein the analog audio interface further includes initialization circuitry coupled to the control registers for initializing the control registers to a set of default values appropriate for the audio functions supported by the analog audio interface, whenever a write operation is performed against the first control register.

14. The computer system of claim 1, wherein the analog audio interface further includes initialization circuitry coupled to the control registers for initializing the control registers to a set of default values appropriate for the audio functions supported by the analog audio interface, at power on or reset.

15. In a computer system, a method for operating a plurality of audio peripherals, the method comprising:
   a) initializing a plurality of control registers of an analog audio interface to a set of control values appropriate for the analog audio interface, in view of audio functions supported by the analog audio interface, including initializing a first control register having a first set of bits indicating audio functions supported by the analog audio interface, and a second set of bits indicating a support kind for a particular audio function; and
   b) adaptively operating the audio peripherals with a device controller, through the analog audio interface and a digital audio controller, in accordance with the audio functions supported by the analog audio interface, including the support kind for the particular audio function.

16. The method of claim 15, wherein (b) includes modifying a plurality of enabling/disabling indicators stored in a second control register to enable or disable certain ones of the audio functions.

17. The method of claim 15, wherein
   the analog audio interface further includes a plurality of independently powered functional components; and
   (b) includes modifying a plurality of power management indicators stored in a second control register to power up or down selected ones of the independently powered functional components.

18. The method of claim 15, wherein (b) further includes modifying a first and a second audio source selection indicator stored in a second control register to select certain input ones of the audio peripherals as a first and a second channel input audio source.

19. The method of claim 15, wherein (b) further includes modifying a gain indicator stored in a second control register to control an amount of gain being applied to an input audio signal.

20. The method of claim 15, wherein (b) further includes modifying a gain indicator stored in a second control register to control an amount of gain being applied to an output audio signal.

21. The method of claim 15, wherein (a) is performed whenever a write operation is performed against the first control register.

22. The method of claim 15, wherein (a) is performed at power on and at reset.

* * * * *